The present invention generally relates to electrodes for fuel cells and/or electric batteries. More specifically, the present invention is concerned with a method for manufacturing electrodes of the type in which significant quantities of the oxides of silver are utilize as an ingredient.

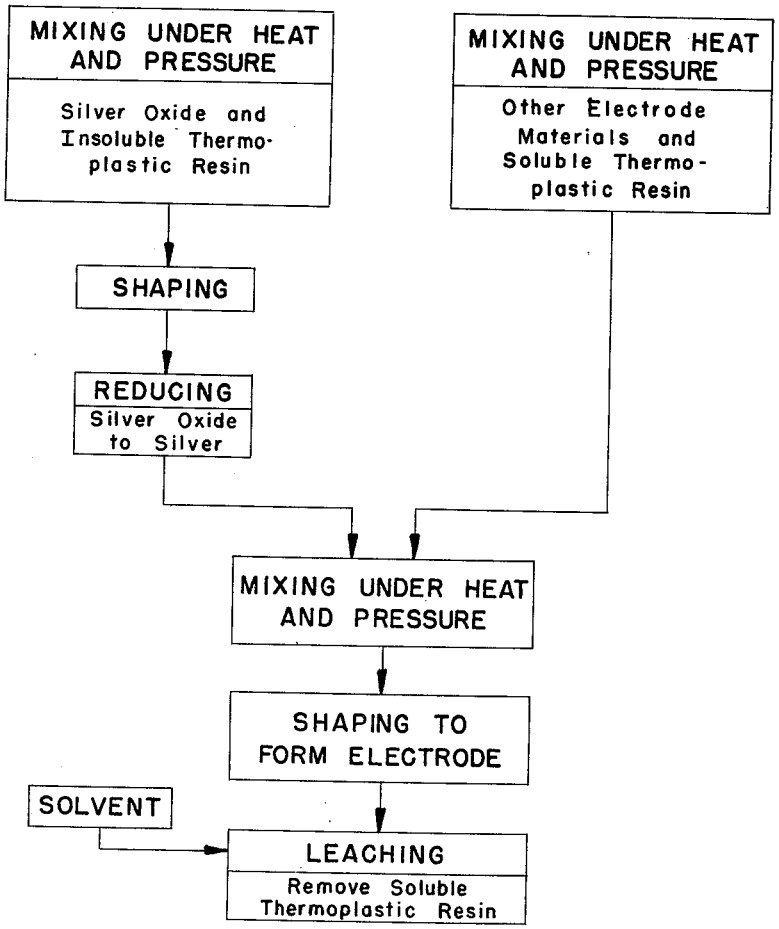
INVENTOR.
JOSEPH C. DUDDY 3,120,457
METHOD OF MANUFACTURING FUEL CELL AND/OR BATTERY ELECTRODE
Joseph C. Duddy, Trevose, Pa., assignor to The Electric Storage Battery Company, a corporation of New Jersey
Filed Nov. 23, 1962, Ser. No. 240,213
5 Claims. (Cl. 136—120)

This application is a continuation-in-part of application, Serial No. 78,875, filed December 28, 1960.

Surface area is an important factor in controlling electrode performance whether the final product is to be used in a battery wherein the electrode material takes part in the electro-chemical reaction thereof, or in a fuel cell wherein the electrode material provides an active site for the cell reaction. One means of achieving maximum electrode surface area is to utilize electrode material having the finest available particle size and to preserve this particle size during the processing of the electrode. To this end, it has heretofore been proposed to utilize the monovalent oxide of silver for the manufacture of electrodes of the type in which finely divided metallic silver is to be the major constituent, since the oxide is available commercially in a much finer particle size than is the metal and retains this size during working. It has been found, however, that only limited amounts of finely divided silver oxide can be incorporated under heat and pressure into plasticized thermoplastic resins without producing a redox system which may result in a violently exothermic reaction which will produce an undesirable fusion of the silver particles which will destroy the porosity and uniformity of the electrode being produced. This limitation is particularly acute when relatively oxidizable thermoplastic polymers of comparatively low molecular weights such as polyethylene oxide are present as a constituent of the resin phase.

In this respect reference is specifically made to my co-pending application, Serial No. 147,702, filed October 13, 1961, and which is a continuation-in-part of applications, Serial Nos. 818,638 and 818,766, both filed June 8, 1959, now abandoned, and my co-pending application, Serial No. 210,187, filed July 16, 1962, which is a continuation-in-part of application, Serial No. 33,942, filed June 6, 1960, now abandoned. Specifically, in the first two of these applications there is disclosed a method for making electrodes in which a first thermoplastic resin, soluble in a given solvent, and a second thermoplastic resin, substantially incompatible with the first thermoplastic resin and insoluble in the given solvent, are intimately mixed under heat and pressure to produce a plasticized mass. After the plasticization and intimate mixing of the two resins, there is added to the plasticized mass the electrode material in powdered form for the particular type of electrode to be produced. After a time interval adequate for the thorough and homogeneous mixing of the powdered electrode material and the thermoplastic resins, the mixture is shaped as by calendering, extruding, or molding to produce material suitable for electrode application. After the shaping of the material and such other treatment as is required to produce the electrode, the soluble resin is leached therefrom by means of a bath in a suitable solvent leaving the electrode material bound in a permanent microporous matrix of the insoluble thermoplastic resin.

In my co-pending application, Serial No. 210,187, there is disclosed a method of manufacturing electrodes which is characterized by the utilization of two intimately mixed incompatible thermoplastic resins, one of which is soluble in a solvent in which the other is insoluble, as a temporary binder for powdered metal electrodes to be structuralized by subsequent sintering. The soluble thermoplastic resin is removed after the shaping of the electrode, but prior to sintering thereof to leave the electrode to be sintered porous. In this manner there is provided uniformly distributed pores in the electrode for the escape of the gaseous products produced by the thermal decomposition of the other thermoplastic resin during sintering. In all of these co-pending applications the following resins are disclosed as being suitable for utilization as the insoluble resin phase: polyethylene, polypropylene, polystyrene, and polyvinyl chloride. Similarly, the following water soluble thermoplastic resins are disclosed as being suitable for use as the soluble or temporary thermoplastic phase: polyethylene oxide, polyethylene glycol, and polyvinyl pyrrolidone. This latter group of resins may be generally characterized by a greater chemical reactivity such as oxidation, solution tendencies and the like.

While not limited thereto, the present invention is particularly adapted to the manufacture of battery and/or fuel cell electrodes by means of the manufacturing methods disclosed and claimed in the foregoing applications of the type in which silver and mixtures of silver and another metal such as palladium, platinum and the metals of the platinum group, gold, and nickel constitute the electrode material and where it is desirable to utilize silver oxide as one of the starting materials. As will be understood by those skilled in the art, the teachings of the present invention will be equally applicable to other methods of electrode manufacture wherein similar binding materials are utilized and the aforementioned redox system is inherent when finely divided silver oxide is utilized.

It is an object of the present invention to provide a method of manufacturing fuel cells and/or battery electrodes which will permitt he use of finely divided silver oxide in electrodes which are manufactured by the processes described and to thus obtain the desirable electrode performance inherent in achieving the maximum surface area provided by the utilization of electrode material having the finest available particle size.

The present invention is characterized by the separate mixing of the silver oxide into the insoluble and more inert resin phase of the electrode system and the other electrode metal or metal oxides into the soluble and more reactive resin phase of the system. The silver oxide is then chemically or electrochemically reduced to silver prior to the mixing of the two resin phases. Specifically, silver oxide particles are intimately mixed under heat and pressure, into the plasticized insoluble resin phase. The resulting thermoplastic and silver oxide mass is then shaped into a form suitable for either the chemical or electrochemical reduction of the silver oxide particles to metallic silver. The reduction of the silver oxide to metallic silver which, for example, can be accomplished electrochemically in an electrolyte against a suitable electrode, or placed in a bath of a suitable reducing agent, produces a resinous matrix having uniformly distributed therethrough silver particles having a particle size substantially that of the silver oxide particles. Next, the water soluble or the more highly reactive component of the resin phase is plasticized and there is intimately mixed therethrough the other electrode material in finely divided form. The insoluble resin and silver mixture produced in the first described steps is then pelletized, plasticized, and intimately mixed with the soluble resin phase and its metallic filler. This mixing can now be safely accomplished under heat and pressure since there is no silver oxide present in either system and the danger of a violent exothermic reaction has been eliminated. Following the thorough and homogeneous mixing of the powdered electrode materials and thermoplastic resins, the resulting mixture is shaped as by extruding or calendering to produce an electrode of the desired configuration. After the shaping of the material or other such treatment as is required for the electrode being produced, the soluble resin phase is leached therefrom, leaving the electrode material bound in a microporous matrix of the insoluble thermoplastic resin. The electrodes thus produced are suitable for use either as battery or fuel cell electrodes, but if desired the resulting electrode may be further structuralized as by sintering in accordance with the teachings of my aforementioned application, Serial No. 210,187.

A better understanding of the present invention may be had from the following description when read with reference to the accompanying drawing which is a flow diagram of the process of the present invention.

In carrying out one form of the present invention, a two resin phase system is utilized to produce a fuel cell electrode comprising silver and nickel. First there is intimately mixed under heat and pressure one part by weight of a thermoplastic resin such as polyethylene and twelve parts by weight of finely divided silver oxide. In this respect it has been found that if more than twelve parts by weight of silver oxide is incorporated under heat and pressure into the polyethylene, a dangerous redox system may be produced. The plasticization of the resin and the intimate mixing of the silver oxide therein may be accomplished in an intensive mixer such as a two-roll rubber mill in which the rollers are operated at differential speeds. A temperature of about 275° F. has been found to be applicable for plasticizing the resin and a time interval on the order of about six minutes has been found adequate for the thorough and intimate mixing of the resin and the silver oxide. For superior electrode performance it is preferable that the silver oxide utilized be of impalpable fineness.

After the mixing of the silver oxide and the resin has been completed, the mixture is removed from the mixer and is then sheeted between calendering rolls operated at a temperature of about 230° F. to produce sheet material suitable for the electrochemical conversion of the silver oxide to metallic silver. The calendering rolls may be set to produce a sheet of any desired thickness, as for example, 10 mils. The calendering step produces sheet material of the thermoplastic resin having intimately dispersed throughout particles of silver oxide which are in sufficient electrical contact with each other to provide a sheet having electrical conductivity. This sheet material is next immersed in a suitable electrolyte such as potassium hydroxide and the silver oxide electrochemically converted to metallic silver against a suitable dummy electrode. For this purpose a mass of zinc may function as the dummy electrode, and the silver oxide discharged to silver with the sheet material acting as positive electrode. In this respect it has been found that if less than 8 parts by weight of silver oxide is incorporated into the insoluble thermoplastic resin phase, that sufficient interparticle contact is lacking to achieve the reduction of the silver oxide to silver.

After the electrochemical conversion of the silver oxide particles to silver, the sheet material is washed and dried and next pelletized to produce material suitable for subsequent plasticization and admixture with the other electrode phase the product of which will now be described in detail.

The second phase of the electrode system is prepared by intimately mixing under heat and pressure one part by weight of a plasticized thermoplastic resin such as polyethylene oxide, which is soluble in a solvent in which polyethylene is insoluble, and three parts by weight of finely divided metallic nickel and three parts by weight of finely divided silver. The plasticization of the polyethylene oxide and the intimate mixing of the nickel and silver therein may be accomplished under the same conditions described for the mixing of the silver oxide into the polyethylene as described hereinbefore. After a time interval adequate for the thorough and intimate mixing of the nickel and silver into the polyethylene oxide, there is added to the plasticized mass on the mill the pelletized polyethylene and silver material produced as described hereinbefore. The two phases are then thoroughly and homogeneously mixed so as to homogeneously disperse the silver and nickel particles throughout the two resins which are in a state of homogeneous dispersion among themselves.

When the mixing of the two phases is accomplished, the mixture may be removed from the mill and shaped as by calendering or extruding to produce an electrode material of the desired geometric configuration. Where the material is to be extruded to produce a fuel cell electrode of the cylindrical shape it has been found desirable to pelletize the mixture of thermoplastic resin and electrode materials prior to feeding it to the extruder. In addition, for fuel cell purposes it has been found desirable in order to provide for more maximum consolidation of the shaped material to extrude it at least twice, this being accomplished by re-grinding the tubes first produced at room temperature and re-extruding the material. A temperature on the order of 225° F. has been found satisfactory for extruder operation where the tubes being produced have a 1/16" wall and a 1" diameter, and where the extruder is operated at a speed which will produce tubular material at a rate of one foot per minute.

Following the shaping of the electrode material, the polyethylene oxide is leached therefrom by soaking the electrodes thus produced in a water bath in which that resin is soluble. For this purpose, it has been found practical to suspend the tubes vertically in a suitable container to which fresh water is continuously fed. Structures having the dimensions given hereinbefore require a leaching time of approximately four hours. The residual leach water may then be removed from the electrodes by air or forced drying in a circulating air oven at a temperature below 180° F. The drying is complete when surface temperatures of the article assume ambient values or when the weight loss becomes constant. It should be understood that at this stage of the processing the electrode materials, namely silver and nickel, are homogeneously and uniformly dispersed throughout a matrix of homogeneously porous polyethylene with the larger percentage of silver present being derived from the silver oxide. The electrodes thus produced are suitable for fuel cell use as is or if desired, may be further structuralized by sintering in accordance with the teachings of the aforementioned co-pending application, Serial No. 210,187.

In another example of the present invention, 17 parts by weight of finely divided silver oxide were intimately mixed under heat and pressure into 1 part by weight of polyethylene to produce a plasticized mass. There was then intimately mixed into this plasticized mass 2 parts by weight of finely divided palladium oxide. Since palladium oxide is available in finer form than powered metallic palladium, it was added here with the silver oxide and reduced therewith to the metal. Following the intimate mixing of these ingredients into a plasticized mass the mixture was removed from the mill and calendered into sheet material. The sheet material was then broken into flakes and poured into a container of liquid reducing agent, for the chemical reduction of the metallic oxides to the metals. For this purpose, formaldehyde or common photographic developer have been found to be effective. Following the reduction of the silver oxide and palladium oxide to metallic silver and palladium respectively, the material was removed from the reducing solution, washed and dried, preparatory to intimate mixing of these resin bound metals into a plasticized mass of polyethylene oxide and the other electrode material.

The second phase of the electrode system was prepared by intimately mixing under heat and pressure 1.68 parts by weight of polyethylene, 2.4 parts by weight of polyethylene oxide, and 44 parts by weight of finely divided nickel powder to produce a plasticized mass. Upon the homogeneous mixing of these two resins and the powered nickel there was added to the mass on the mill 9.15 parts by weight of the silver, palladium, and polyethylene mixture produced as just described. Following the intimate and homogeneous mixing of all these ingredients the material was removed from the mill and calendered into sheet material. It should be noted that the additional polyethylene was added to this mix to provide enough permanent resin binder to support the heavy loadings of active material described. The calendered material was then broken up into fine flakes and extruded under conditions as described hereinbefore to produce a tubular fuel cell electrode.

Following the shaping of the tubular electrode, the polyethylene oxide was leached therefrom by soaking the electrode thus produced in a water bath to leave the electrode materials bound in a porous matrix of polyethylene. The porous structure thus produced was found to be operable without further treatment as a fuel cell electrode. Some of the electrodes thus produced were structuralized by sintering in accordance with the teachings of the aforementioned co-pending application, Serial No. 210,187.

It should be understood that modifications may be made in the present invention as described hereinbefore without departing from the spirit of the invention as set forth in the appended claims. Specifically, resins other than polyethylene may be utilized as the insoluble resin phase. By way of example, polypropylene, polystyrene and polyvinyl chloride may be utilized. Similarly, polyethylene glycol and polyvinyl pyrrolidone may be utilized in lieu of the polyethylene oxide as the soluble resin phase. These resins have the specific advantage of being water soluble. In addition, the amount of silver oxide incorporated into the insoluble resin phase may be varied from 8 to 20 parts by weight of that resin. However, as noted hereinbefore, the upper limit stated should not be exceeded for fear of producing a dangerous redox system. Other electrode materials may be substituted for the component specified, as for example, metallic silver, palladium, platinum and the metals of the platinum group, gold and nickel and mixtures of metallic silver and these metals. The amounts of these other electrode ingredients as well as the amount of nickel may vary from that given in the specific example cited within the ranges of load of the soluble resin phase which can be achieved. Of course, as will be understood by those skilled in the art, the particular loading of these other electrode materials will depend primarily upon the amount of such ingredients desired to be present in the finished electrode.

Still further, chemical means such as soaking the sheeted insoluble resin phase and silver oxide in a suitable reducing agent may be utilized to reduce the silver oxide incorporated into the permanent resin phase to metallic silver. In addition, silver oxide may be reduced to metallic silver by exposing the silver oxide permanent resin mixture to an elevated temperature. In this respect, it should be noted that the use of extremely high temperatures to reduce the silver oxide to silver must be avoided in order not to ignite the system. The thermal reduction of the silver oxide consequently is not a desired method of reduction, inasmuch as low temperatures and extended periods of time are necessary to accomplish the complete reduction of the silver oxide to metallic silver.

In considering the present invention it can be seen that there has been provided a means for incorporating maximum quantities of silver oxide into two-phase resin systems of the type described thereby permitting utilization of maximum amounts of extremely fine particle size silver in finished electrodes. Accordingly, the method of the present invention provides means for achieving an electrode structure having the maximum surface area by reason of the utilization of electrode material of the finest particle size, by completely eliminating the dangers attending the incorporation of these materials into thermoplastic resins under heat and pressure.

Having described the present invention, that which is claimed as new is:

1. A method of making electrodes which comprises the steps of intimately mixing under heat and pressure one part by weight of a first thermoplastic resin selected from the group consisting of polyethylene, polypropylene, polystyrene, and polyvinyl chloride and 8 to 20 parts by weight of finely divided silver oxide to produce a first plasticized mass, said mixing being carried out at a temperature being sufficient to plasticize said resin, but insufficient to reduce said silver oxide to silver and insufficient to substantially degrade said resin, shaping said first mass to a form suitable for the reduction of said silver oxide therein to silver, reducing in said shaped mass said silver oxide to silver by means not involving heat sufficient to ignite said silver oxide and said polyethylene, intimately mixing under heat and pressure a second thermoplastic resin selected from the group consisting of polyethylene oxide, polyethylene glycol, and polyvinyl pyrrolidone and another electrode material to produce a second plasticized mass, said mixing being carried out at a temperature sufficient to plasticize said second thermoplastic resin, but insufficient to degrade said second thermoplastic resin, intimately mixing under heat and pressure said first thermoplastic resin and silver and said second thermoplastic mass to produce a third plasticized mass in which said second thermoplastic resin is present in a ratio based on parts by weight of said first thermoplastic resin of between 1 to 3 and 3 to 1, said mixing being carried out at a temperature sufficient to plasticize said first thermoplastic resin and said second thermoplastic resin, but insufficient to degrade said resins, shaping said third mass to produce an electrode assembly and subjecting said assembly to a solvent in which said first thermoplastic resin, said silver, and said other electrode material are insoluble and said second thermoplastic resin is soluble to leach from said assembly said second thermoplastic resin to produce an electrode comprising silver derived from said silver oxide and said other electrode material homogeneously dispersed throughout a porous matrix of said first thermoplastic resin.

2. The method of claim 1 wherein said electrode is further structuralized by sintering said silver and said other electrode material.

3. The method of claim 1 wherein said first thermoplastic resin is polyethylene.

4. The method of claim 1 wherein said second thermoplastic resin is polyethylene oxide.

5. A method of making electrodes which comprises the steps of intimately mixing under heat and pressure 1 part by weight of polyethylene and 12 parts by weight of finely divided silver oxide to produce a first plasticized mass, said mixing being carried out at a temperature sufficient to plasticize said polyethylene, but insufficient to reduce said silver oxide to silver and insufficient to degrade said polyethylene, shaping said first mass to a form suitable for the electrochemical reduction of said silver oxide therein to silver, electrochemically reducing in said shaped mass said silver oxide to silver, intimately mixing under heat and pressure 1 part by weight of polyethylene oxide and 3 parts by weight of nickel and 3 parts by weight of finely divided silver to produce a second plasticized mass, said mixing being carried out at a temperature sufficient to plasticize said polyethylene oxide, but insufficient to degrade said polyethylene oxide, intimately mixing under heat and pressure said first thermoplastic resin and silver and said second thermoplastic mass to produce a third plasticized mass, said mixing being carried out at a temperature to plasticize said polyethylene and said polyethylene oxide, but insufficient to degrade said polyethylene and polyethylene oxide, shaping said third mass to produce an electrode assembly and subjecting said assembly to a water bath to leach from said assembly said polyethylene oxide to produce an electrode comprising silver derived from said silver oxide and said nickel and said silver homogeneously dispersed throughout a porous matrix of polyethylene.

No references cited.